US011085533B2

(12) United States Patent
Kittaka et al.

(10) Patent No.: US 11,085,533 B2
(45) Date of Patent: Aug. 10, 2021

(54) VEHICLE POWER UNIT

(71) Applicant: HONDA MOTOR CO., LTD., Tokyo (JP)

(72) Inventors: Eiji Kittaka, Wako (JP); Takashi Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 177 days.

(21) Appl. No.: 16/371,485

(22) Filed: Apr. 1, 2019

(65) Prior Publication Data

US 2019/0309843 A1 Oct. 10, 2019

(30) Foreign Application Priority Data

Apr. 5, 2018 (JP) .............................. JP2018-072919

(51) Int. Cl.
| | |
|---|---|
| *F16H 61/32* | (2006.01) |
| *B60W 20/30* | (2016.01) |
| *F16H 57/02* | (2012.01) |
| *F16H 63/18* | (2006.01) |

(52) U.S. Cl.
CPC ............ *F16H 61/32* (2013.01); *B60W 20/30* (2013.01); *F16H 57/02* (2013.01); *F16H 63/18* (2013.01); *F16H 2057/0203* (2013.01)

(58) Field of Classification Search
CPC .. F16H 61/32; F16H 57/02; F16H 2057/0203; B60W 20/30
USPC ......................................................... 74/330
See application file for complete search history.

(56) References Cited

U.S. PATENT DOCUMENTS

| | | | | |
|---|---|---|---|---|
| 3,589,483 | A | * 6/1971 | Smith ..................... | F16H 3/097 192/3.52 |
| 5,492,034 | A | * 2/1996 | Bogema .................. | F16H 3/095 74/15.86 |
| 5,931,758 | A | * 8/1999 | Walter .................... | F16H 47/04 475/72 |

(Continued)

FOREIGN PATENT DOCUMENTS

| | | |
|---|---|---|
| JP | 2007-205394 A | 8/2007 |
| JP | 2008-115883 | 5/2008 |

(Continued)

OTHER PUBLICATIONS

Office Action dated Aug. 6, 2019 issued in the corresponding Japanese patent application No. 2018-072919.

*Primary Examiner* — Ha Dinh Ho (74) *Attorney, Agent, or Firm* — Carrier Blackman & Associates, P.C.; Joseph P. Carrier; Fulchand P. Shende (57) ABSTRACT

In a vehicle power unit, a drum rotary shaft member on one side of a shift drum is provided with a driven gear. A case side wall on one side of an engine crankcase supporting the drum rotary shaft member is covered by a case cover member in opposing relation thereto. A shift motor is mounted to the case cover member, with a driving gear thereof directed to protrude toward the case side wall. A speed reducing gear train has gear shafts and provides a multiplicity of speed reduction stages for transmitting power from the driving gear to the driven gear. The speed reducing gear train is arranged with both ends of its gear shafts thereof supported on the case side wall and the case cover member, respectively. Such arrangement provides a vehicle power unit for a fast and smooth shift by an electric motor.

9 Claims, 6 Drawing Sheets

(56) References Cited

U.S. PATENT DOCUMENTS

| | | | | |
|---|---|---|---|---|
| 6,056,661 A | * | 5/2000 | Schmidt | F16H 37/022 |
| | | | | 475/207 |
| 7,640,819 B2 | | 1/2010 | Yokotani et al. | |
| 2004/0144190 A1 | * | 7/2004 | Hall, III | F16H 3/12 |
| | | | | 74/331 |

FOREIGN PATENT DOCUMENTS

| | | |
|---|---|---|
| JP | 2011-073591 | 4/2011 |
| JP | 2012-206533 A | 10/2012 |
| JP | 2014-070649 | 4/2014 |
| JP | 2017-180694 | 10/2017 |

* cited by examiner

VEHICLE POWER UNIT

TECHNICAL FIELD

The present invention relates to a vehicle power unit mounted on a small-type vehicle.

BACKGROUND ART

Patent Document 1 and so on describes a vehicle power unit longitudinally mounted on a small-type vehicle, wherein an internal combustion engine (E) and a transmission system are integrally supported on left and right sides relative to an engine crankcase, with an engine crankshaft directed in a vehicle longitudinal direction, and wherein the transmission system includes a transmission having gear pairs differing in transmission gear ratio for transmitting power, and a shift driving mechanism having a shift drum rotated by a shift motor to make a shift by changing the gear pair for transmitting power in the transmission through movement of a shift fork guided by the shift drum.

PRIOR ART DOCUMENT

Patent Document

[Patent Document 1]
Patent Document 1 JP 2007-205394 A

In the vehicle power unit disclosed in Patent Document 1, front and rear case side walls of the engine crankcase supporting the crankshaft in the state of being directed in the vehicle longitudinal direction also support a main shaft and a counter shaft of the transmission, which are directed in the vehicle longitudinal direction, and the shift drum of the shift driving mechanism.

A shift spindle is arranged to penetrate the front-side case side wall, a case cover (clutch cover) covering the front-side case side wall from the front side and the rear-side case side wall, and the shift motor is attached to the case cover from the front side.

Besides, a gear fitted to a front end of the shift spindle, which front end penetrates the case cover, is in power transmitting connection, through a speed reducing gear mechanism, with a driving gear of the shift motor attached to the case cover from the front side.

On the other hand, oscillation of a master arm, fitted on an intermediate portion of the shift spindle along the front-side case side wall, is transmitted to the shift drum through an intermittent feeding mechanism, to rotate the shift drum by a predetermined angle.

SUMMARY OF THE INVENTION

Underlying Problem to be Solved by the Invention

In this way, in the shift driving mechanism disclosed in Patent Document 1, the speed reducing gear mechanism is provided at a front portion of the shift spindle, the intermittent feeding mechanism is provided at an intermediate portion of the shift spindle together with the master arm, and the speed reducing gear mechanism and the intermittent feeding mechanism are disposed in a state of being spaced apart on the front and rear sides of the shift spindle. Therefore, layout spaces for the mechanisms are required, the transmission system is enlarged in the vehicle longitudinal direction, the vehicle power unit is enlarged in size, and the number of component parts of the shift driving mechanism is large, thus leading to a complicated structure and an increased cost.

Meanwhile, a faster and smoother shift as compared to a shift by means of an electric motor is desired.

The present invention has been made in consideration of the above-described circumstances, and it is an object of the present invention to provide at low cost a vehicle power unit with which it is possible to reduce the number of component parts of the shift driving mechanism, to thereby simplify the structure, to restrain an enlargement of the transmission system, and to realize a reduction in size.

Means to Solve the Problem

To achieve the above object, according to the present invention, there is provided a vehicle power unit longitudinally mounted on a small-type vehicle, wherein an internal combustion engine and a transmission system are integrally supported on left and right sides relative to a crankcase of the engine, with a crankshaft of the engine directed in a vehicle longitudinal direction, and wherein the transmission system includes a transmission having gear pairs differing in transmission gear ratio for transmitting power, and a shift driving mechanism having a shift drum rotated by a shift motor to make a shift by changing the gear pair for transmitting power in the transmission through movement of a shift fork guided by the shift drum, characterized in that:

the shift drum has front and rear drum rotary shaft members rotatably supported on front and rear case side walls of the crankcase; one of the drum rotary shaft members of the shift drum is provided with a driven gear; one of the case side walls of the crankcase supporting the one drum rotary shaft member provided with the driven gear is covered by a case cover member in opposing disposition thereto; the shift motor has a driving gear supported by the one case cover member so as to protrude toward the one case side wall; and a speed reducing gear train having gear shafts to provide a multiplicity of speed reduction stages for transmitting power from the driving gear to the driven gear is arranged with ends of the gear shafts thereof supported on the one case side wall and the one case cover member, respectively.

According to the above arrangement, in the vehicle power unit longitudinally mounted on the small-type vehicle and having the internal combustion engine and the transmission system integrally accommodated in the crankcase, the transmission system includes the transmission and the shift driving mechanism, the drum rotary shaft member on one side of the shift drum is provided with the driven gear, the case side wall on one side of the crankcase supporting the drum rotary shaft member on the one side provided with the driven gear is covered by the case cover member in opposition thereto, and the speed reducing gear train having the multiplicity of speed reduction stages for transmitting power from the driving gear of the shift motor attached to the case cover member to the driven gear is arranged with both ends of the gear shafts thereof supported by the case side wall and the case cover member. Therefore, the shift driving mechanism can be arranged in an integrated manner on the one case side wall, an enlargement of the transmission system can be restricted, and a reduction in the size of the vehicle power unit can be realized.

In addition, since the rotational drive of the shift motor is transmitted to the shift drum through only the speed reducing gear train, an intermittent feeding mechanism can be omitted, the number of component parts of the shift driving mechanism can be reduced, the structure can be simplified, an enlargement of the transmission system can be suppressed, and further reductions in the size and cost of the vehicle power unit can be realized. Besides, a faster and smoother shift by an electric motor can be realized.

With the intermediate feeding mechanism omitted, generation of shifting noises by the intermittent feeding mechanism is avoided, and a soundproof structure is not needed.

In a preferred embodiment of the invention, the shift motor is a DC electric motor having a maximum of a pulsating cogging torque of 0.04 to 0.07 Nm; and the speed reducing gear train has a speed reduction ratio of from 23 to 45.

In the above configuration, the shift motor is the DC motor having a maximum of cogging torque of 0.04 to 0.07 Nm. Thus, the maximum of the cogging torque is equal to or greater than 0.04 Nm. In addition, the gear train for transmitting power to the shift drum has the multiplicity of speed reduction stages with a speed reduction ratio of from 23 to 45. This ensures that an overshoot amount can be suppressed to a low level by effectively using the braking of the shift motor by the cogging torque. Therefore, the shift drum can be easily stopped at required rotational positions, in spite of the omission of an intermittent feeding mechanism. Thus, it is possible to reduce the number of component parts of the shift driving mechanism, thereby to simplify the structure, to suppress an enlargement of the transmission system, and to realize reductions in the size and cost of the vehicle power unit.

In case the speed reduction ratio of the speed reducing gear train is equal to or higher than 23, the shift drum can be stopped at required rotational positions, even though a stopper mechanism is omitted. The transmission system can be reduced in size, according to the omission of the stopper mechanism, and a further reduction in the size of the vehicle power unit can be realized.

On the other hand, if the speed reduction ratio of the speed reducing gear train exceeds 45, a considerable time is required for movement of the transmission gears, so that switching of the speed stage is slowed, and smooth meshing of a dog clutch is not realized.

Therefore, it becomes necessary to increase the size and output of the shift motor.

In a preferred embodiment of the invention, the driving gear is located under the driven gear; the speed reducing gear train is arranged to surround the driving gear; and the speed reducing gear train has speed reducing gears overlapping with the shift motor in front view.

According to this arrangement, the driving gear is located under the driven gear, the speed reducing gear train is arranged such as to surround the driving gear, and each speed reducing gear of the speed reducing gear train overlaps with the shift motor in front view. Therefore, the speed reducing gear train is collectively arranged in the surroundings of the driving gear, the shift driving mechanism can be arranged in an integrated manner on the case side wall on one side, an enlargement of the transmission system can be restrained, and a reduction in the size of the vehicle power unit can be promoted.

In a further preferred embodiment of the invention, the transmission has main shafts under which the shift drum is disposed; clutch devices are provided at end portions of the main shafts, the end portions protruding beyond the one case side wall; and the shift motor is disposed under the clutch devices.

According to the above arrangement, the shift drum is disposed under the main shafts of the transmission, and the shift motor is disposed under the clutch device provided at the end portion of the main shafts which end portion protrudes beyond the case side wall on the one side. Therefore, the shift motor is accommodated in a space under the clutch device on the front side relative to the shift drum, and can be disposed in a compact fashion.

In a still further preferred embodiment of the invention, the clutch devices are covered by a clutch cover; and the shift motor is located under the clutch cover.

According to such arrangement, since the shift motor is located under the clutch cover, the shift motor is covered by the clutch cover on the upper side thereof, and is protected from rainwater.

In a preferred embodiment of the invention, a drum rotational angle sensor for detecting rotational angle of the shift drum is mounted to the case cover member while being interposed between the clutch cover and the shift motor, and the drum rotational angle sensor is connected to an end portion, penetrating the case cover member, of the one drum rotary shaft member.

According to this arrangement, the drum rotational angle sensor is attached to the case cover member while being interposed between the clutch cover and the shift motor, in connection with the end portion of the drum rotary shaft member on the one side which end portion penetrates the case cover member. Therefore, the drum rotational angle sensor is interposed between the clutch cover and the shift motor, and is protected from external forces such as flying stones.

In a preferred embodiment of the invention, an end portion of the other drum rotary shaft member opposite to the one drum rotary shaft member is a shifting knob for manual shifting operation.

According to this feature, the end portion of the drum rotary shaft member on the other side opposite to the drum rotary shaft member on the one side provided with the driven gear is the shifting knob for manual shifting operation. Therefore, the shifting knob is located on the side opposite to the shift motor, and can be operated without being obstructed by the shift motor and, hence, with good operability.

Effect of the Invention

According to the present invention, in a vehicle power unit which is longitudinally mounted on a small-type vehicle and which has an internal combustion engine and a transmission system integrally accommodated in a crankcase, the transmission system includes a transmission and a shift driving mechanism, a drum rotary shaft member on one side of a shift drum is provided with a driven gear, a case side wall on one side of the crankcase supporting the drum rotary shaft member on the one side provided with the driven gear is covered by a case cover member opposed thereto, and a speed reducing gear train having a multiplicity of speed stages for transmitting power from a driving gear of a shift motor attached to the case cover member to the driven gear is arranged with both ends of gear shafts thereof supported by the case side wall and the case cover member. Therefore, the shift driving mechanism can be arranged in an integrated manner on the case side wall, an enlargement of the transmission system can be restrained, and a reduction in size of the vehicle power unit can be realized.

In addition, since rotational drive of the shift motor is transmitted to the shift drum through only the speed reducing gear train, an intermittent feeding mechanism can be omitted, and it is possible to reduce the number of component parts of the shift driving mechanism, thereby to simplify the structure, to restrain an enlargement of the transmission system, and to realize further reductions in size and cost of the vehicle power unit. Besides, a faster and smoother shift by an electric motor can be realized.

With the intermittent feeding mechanism omitted, generation of shifting noises by the intermittent feeding mechanism is avoided, and a soundproof structure is not needed.

MODES FOR CARRYING OUT THE INVENTION

An embodiment of the present invention will be described below, with reference to the drawings.

Figure 1:
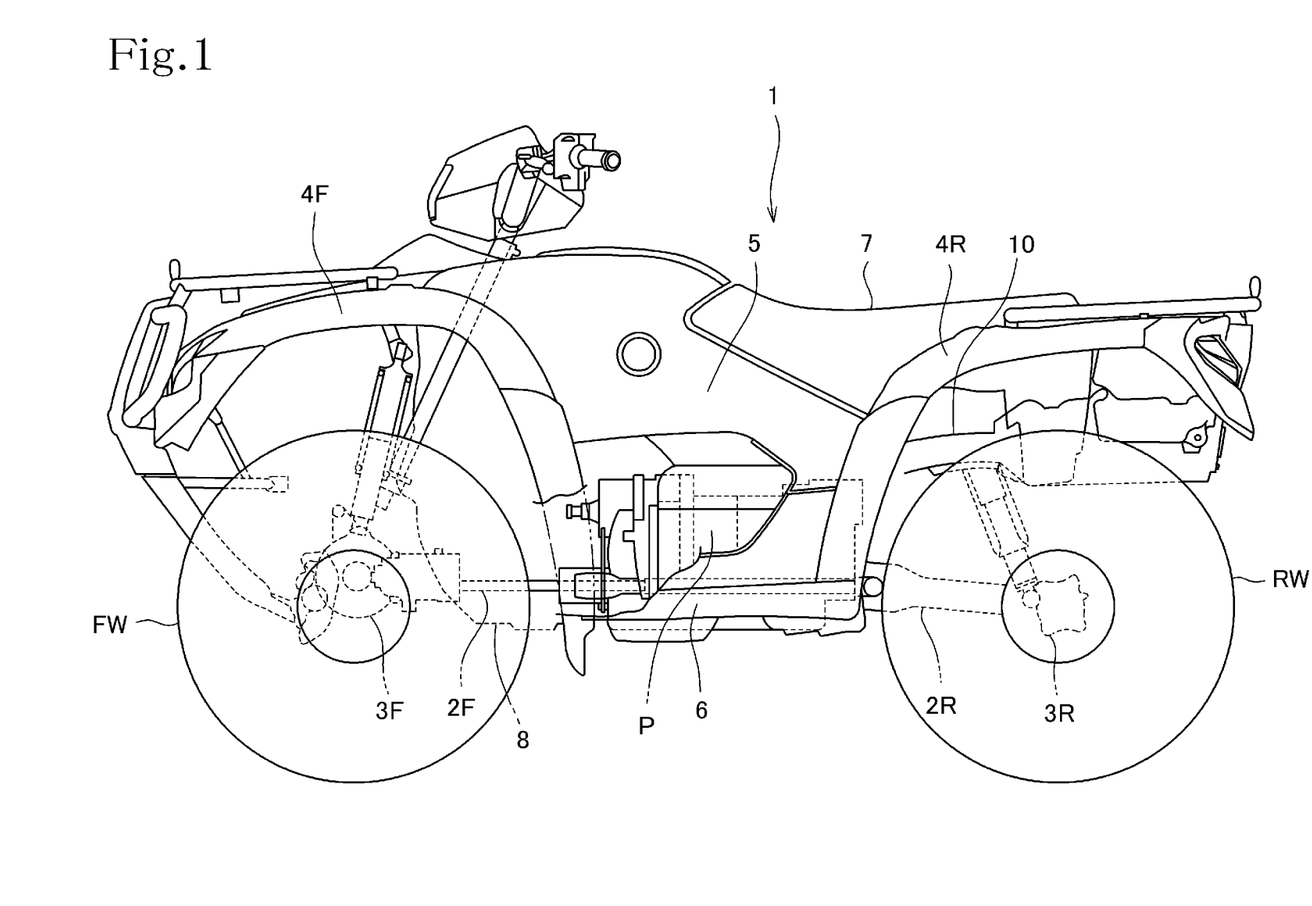
FIG. 1 is a left side view of an all terrain vehicle on which is mounted a vehicle power unit according to an embodiment of the present invention.

As shown in FIG. 1, a vehicle power unit P according to the present embodiment is a power unit mounted on an all terrain vehicle 1 as a small-type vehicle.

The forward, rearward, leftward and rightward directions in the description herein are in conformity with a normal standard in which the forward traveling direction of the all terrain vehicle 1, on which the power unit according to the present embodiment is mounted, is the forward direction. In the drawings, FR indicates the front side, RR indicates the rear side, LH indicates the left-hand side, and RH indicates the right-hand side.

As shown in FIG. 1, the all terrain vehicle 1 is a saddled four-wheel vehicle, in which a pair of left and right front wheels FW and a pair of left and right rear wheels RW including low-pressure balloon tires for all terrain use are suspended on front and right sides of a body frame 8.

The vehicle power unit P is mounted on the body frame 8 at an intermediate position between the front wheels FW and the rear wheels RW.

Figure 2:
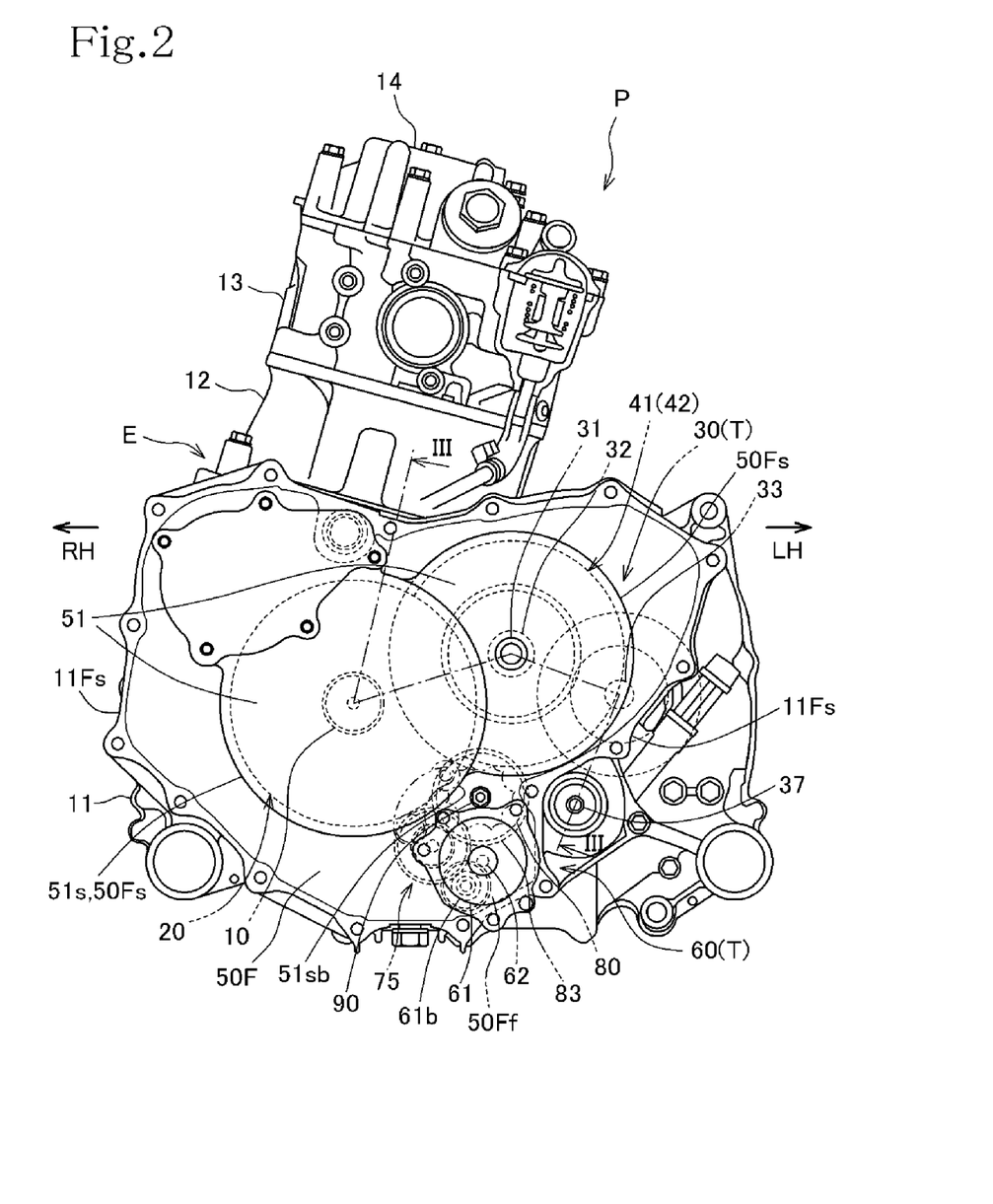
FIG. 2 is a front view of the vehicle power unit.

As shown in FIG. 2, the vehicle power unit P has an internal combustion engine E and a transmission system T provided on the left side thereof which are integrally configured at a crankcase 11, and is longitudinally installed on the all terrain vehicle 1 with a crankshaft 10 directed in the vehicle longitudinal direction.

An output shaft 37 of the vehicle power unit P is projecting from the transmission system T, and is directed, in the vehicle longitudinal direction. Rotational power of the output shaft 37 is transmitted, as shown in FIG. 1, from a front end of the output shaft 37 to the left and right front wheels FW through a front drive shaft 2F and a front final reduction gear unit 3F. Rotational power of the output shaft 37 is also transmitted from a rear end of the output shaft 37 to the left and right rear wheels RW through a rear drive shaft 2R and a rear final reduction gear unit 3R.

The upper side to the rear side of the front wheels FW are covered with front fenders 4F, the upper side to the front side of the rear wheels RW are covered with rear fenders 4R, and the left and right sides of the internal combustion engine E mounted between the front wheels FW and the rear wheels RW are covered with side covers 5. Step plates 6 are projected from lower end edges of the side covers 5 toward outer sides, and the step plates 6 are arranged between the front fenders 4F and the rear fenders 4R.

A seat 7 is provided between the left and right rear fenders 4R.

Figure 3:
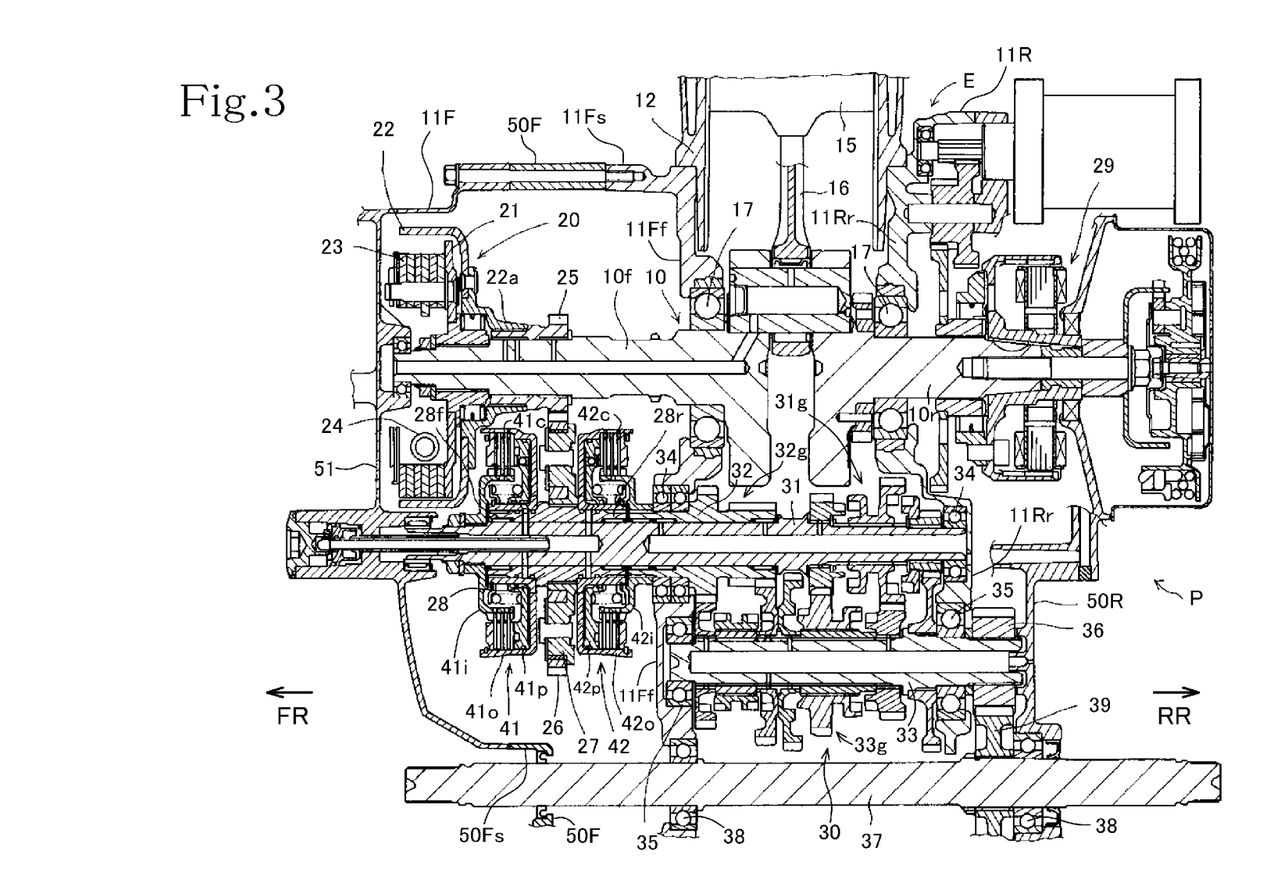
FIG. 3 is a developed sectional view of the vehicle power unit taken along arrows III-III of FIG. 2.

Referring to FIGS. 2 and 3, the internal combustion engine E is a water-cooled, single-cylinder, four-stroke internal combustion engine, and has an engine main body including a cylinder block 12 in which a piston 15 is reciprocatably fitted, a cylinder head 13 and a cylinder head cover 14 sequentially stacked over and connected to the cylinder head 12, and a crankcase 11 connected to a lower end portion of the cylinder head 12.

A reciprocating motion of the piston 15 is transmitted through a connecting rod 16, to rotate the crankshaft 10.

The crankcase 11, in which the crankshaft 10 directed in the vehicle longitudinal direction is rotatably supported through a pair of main bearings 17, has a front-rear split structure including a front crankcase half 11F and a rear crankcase half 11R obtained by dividing the crankcase 11 into front and rear portions at a plane orthogonal to the crankshaft 10.

A front-side case side wall 11Ff and a rear-side case side wall 11Rr, opposed to each other, of the front crankcase half 11F and the rear crankcase half 11R support the crankshaft 10 in a rotatable manner through the main bearings 17.

A centrifugal starting clutch 20 is attached to a front end of a front-side crankshaft portion 10f of the crankshaft 10. The front-side crankshaft portion 10f penetrates the front-side case side wall 11Ff.

The starting clutch 20 includes a plate-shaped clutch inner member 21 rotated as one body with the crankshaft 10, a bowl-shaped clutch outer member 22 surrounding the clutch inner member 21 on a radially outer side, and clutch shoes 23 capable of oscillation as a centrifugal weight pivotally supported by the clutch inner member 21.

When engine rotational speed exceeds an idling speed, the clutch shoes 23 are oscillated outward in the radial directions of the crankshaft 10 by a centrifugal force against a resilient force of a clutch spring 24 and starts making contact with the clutch outer member 22, and the power of the internal combustion engine E starts to be transmitted from the clutch inner member 21 to the clutch outer member 22.

As the engine rotational speed increases, the starting clutch 20 is brought into a completely engaged state in which the clutch inner member 21 and the clutch outer member 22 are rotated as one body, through a partial clutch engagement state (partially engaged state) in which the clutch outer member 22 is rotated with a little slip generated between itself and the clutch shoes 23.

An AC generator 29 is attached to a rear end portion of a rear-side crankshaft portion 10r of the crankshaft 10, penetrating the rear-side case side wall 11Rr.

The AC generator 29 is located on the rear side relative to the rear-side case side wall 11Rr of the crankcase 11 and is covered by a rear-side case cover 50R that covers the rear-side case side wall 11Rr from the rear side.

Referring to FIG. 2, the transmission system T located on the left side of the crankshaft 10 of the internal combustion engine E includes a transmission 30 and a shift driving mechanism 60 that makes a shift by driving the transmission 30.

A main shaft of the transmission 30 includes a first main shaft 31 and a second main shaft 32 that overlap coaxially, and the second main shaft 32 is partly fitted over the first main shaft 31 in a relatively rotatable manner as illustrated in FIG. 3.

As illustrated in FIG. 2, the coaxial first main shaft 31 and second main shaft 32, which are parallel to the crankshaft 10 of the transmission 30, are located on an obliquely left upper side of the crankshaft 10. A counter shaft 33, also parallel to the crankshaft 10, of the transmission 30 is located on a further obliquely left lower side of the first and second main shafts 31 and 32 and at substantially the same height as the crankshaft 10.

The coaxial first and second main shafts 31 and 32 and the counter shaft 33 directed in the vehicle longitudinal direction are rotatably supported on the front-side case side wall 11Ff of the front crankcase half 11F and the rear-side case side wall 11Rr of the rear crankcase half 11R through bearings 34, 34 and 35, 35, respectively.

The second main shaft 32 axially overlapping with the first main shaft 31 is supported by the bearing 34 on the front side. On the front side relative to the front-side bearing 34, a sleeve 28 is rotatably fitted that portion of the first main shaft 31 which protrudes forward beyond the second main shaft 32. A twin clutch including a first shift clutch 41 and a second shift clutch 42 is provided on the sleeve 28.

A driven gear 26 is fitted to an outer periphery of a gear disc 27 fitted to an intermediate portion of the sleeve 28.

The driven gear 26 meshes with a driving gear 25 provided to be integral with the clutch outer member 22 of the starting clutch 20.

Clutch outer members 41o and 42o of the first and second shift clutches 41 and 42 are fitted to front and rear connection portions 28f and 28r of the gear disc 27 of the sleeve 28, and are rotated together with the driven gear 26.

Clutch inner members 41i and 42i of the first and second shift clutches 41 and 42 are fitted to the first main shaft 31 and the second main shaft 32, respectively.

A plurality of clutch discs 41c axially movably fitted are alternately overlappingly interposed between the clutch outer member 41o and the clutch inner member 41i of the first shift clutch 41.

Similarly, a plurality of clutch discs 42c axially movably fitted are alternately overlappingly interposed between the clutch outer member 42o and the clutch inner member 42i of the second shift clutch 42.

When a pressure plate 41p of the first shift clutch 41 presses the clutch discs 41c by hydraulic pressure, the clutch is engaged, and, when the pressing is released, the clutch is disengaged.

Similarly, when a pressure plate 42p of the second shift clutch 42 presses the clutch discs 42c by hydraulic pressure, the clutch is engaged, and, when the pressing is released, the clutch is disengaged.

Therefore, when the starting clutch 20 is put into an engaged state, the rotation of the crankshaft 10 is transmitted through the meshing of the driving gear 25 and the driven gear 26 to the sleeve 28 and the clutch outer members 41o and 42o of the first and second clutches 41 and 42, to rotate the same.

When the pressure plate 41p of the first shift clutch 41 presses the clutch discs 41c, the clutch outer member 41o and the clutch inner member 41i are engaged with each other, and power is transmitted to the first main shaft 31.

Further, when the pressure plate 42p of the second shift clutch 42 presses the clutch discs 42c, the clutch outer member 42o and the clutch inner member 42i are engaged with each other, and power is transmitted to the second main shaft 32.

A hydraulic pressure control is conducted such that when one of the first shift clutch 41 and the second shift clutch 42 is in an engaged state, the other is in a disengaged state.

An odd-numbered speed stage transmission driving gear group 31g is supported on the first main shaft 31 of the transmission 30, while an even-numbered speed stage transmission driving gear group 32g is supported on the second main shaft 32. A transmission driven gear group 33g is supported on the counter shaft 33.

Transmission driving gears of the transmission driving gear groups 31g and 32g are normally in mesh with transmission driven gears of the transmission driven gear group 33g which are paired with the transmission driving gears on a speed stage basis.

Some shifter gears of the transmission driving gear groups 31g and 32g and the transmission driven gear group 33g are moved in the axial directions to engage with the adjacent gears, whereby power is transmitted from the first and second main shafts 31 and 32 to the counter shaft 33.

Under the counter shaft 33, an output shaft 37 is disposed in parallel with the counter shaft 33, as will be noted from FIG. 2.

The output shaft 37 directed in the vehicle longitudinal direction is rotatably supported on the front-side case side wall 11Ff of the front crankcase half 11F and the rear-side case cover 50R through bearings 38.

An output driving gear 36 is fitted to a rear end portion of the counter shaft 33 which rear end portion penetrates a rear-side bearing 35 toward the rear side, and the output driving gear 36 and an output driven gear 39 fitted to the output shaft 37 are in mesh with each other.

Therefore, rotation of the counter shaft 33 is transmitted to the output shaft 37.

The output shaft 37 protrudes to the front and rear sides of the vehicle power unit P.

As depicted in FIG. 2, the shift driving mechanism 60 for gear shifting in the transmission 30 is disposed under the first and second main shafts 31 and 32.

Referring to FIG. 2, a front-side case cover 50F covering the front side of the front-side case side wall 11Ff of the front crankcase half 11F is provided in the state of being fastened to an end face of a case frame wall 11Fs which extends forward along a peripheral edge of the front-side case side wall 11Ff and is formed in an annular shape.

It is to be noted, however, that the case frame wall 11Fs has its left lower portion recessed to an inner side relative to a peripheral edge of the front-side case side wall 11Ff, to prevent interference with the output shaft 37.

Since the front-side case cover 50F is attached to the case frame wall 11Fs with its peripheral edge fastened to the case frame wall 11Fs, the shift driving mechanism 60 is covered by the front-side case cover 50F, although the output shaft 37 protrudes to the exterior without being covered by the front-side case cover 50F.

The front-side case cover 50F covering the inside of the case frame wall 11Fs is formed, in the center area thereof, with a double tubular portion 50Fs having an outer peripheral edge shape including two circular arcs which partly overlap with each other. One of the double tubular portion 50Fs surrounds the starting clutch 20, while the other of the double tubular portion 50Fs surrounds the first and second shift clutches 41 and 42. A clutch cover 51 covering the inside of the double tubular portion 50Fs from the front side covers the starting clutch 20 and the first and second shift clutches 41 and 42.

The clutch cover 51 has a double tubular peripheral wall 51s corresponding to the double tubular portion 50Fs of the front-side case cover 50F.

Figure 4:
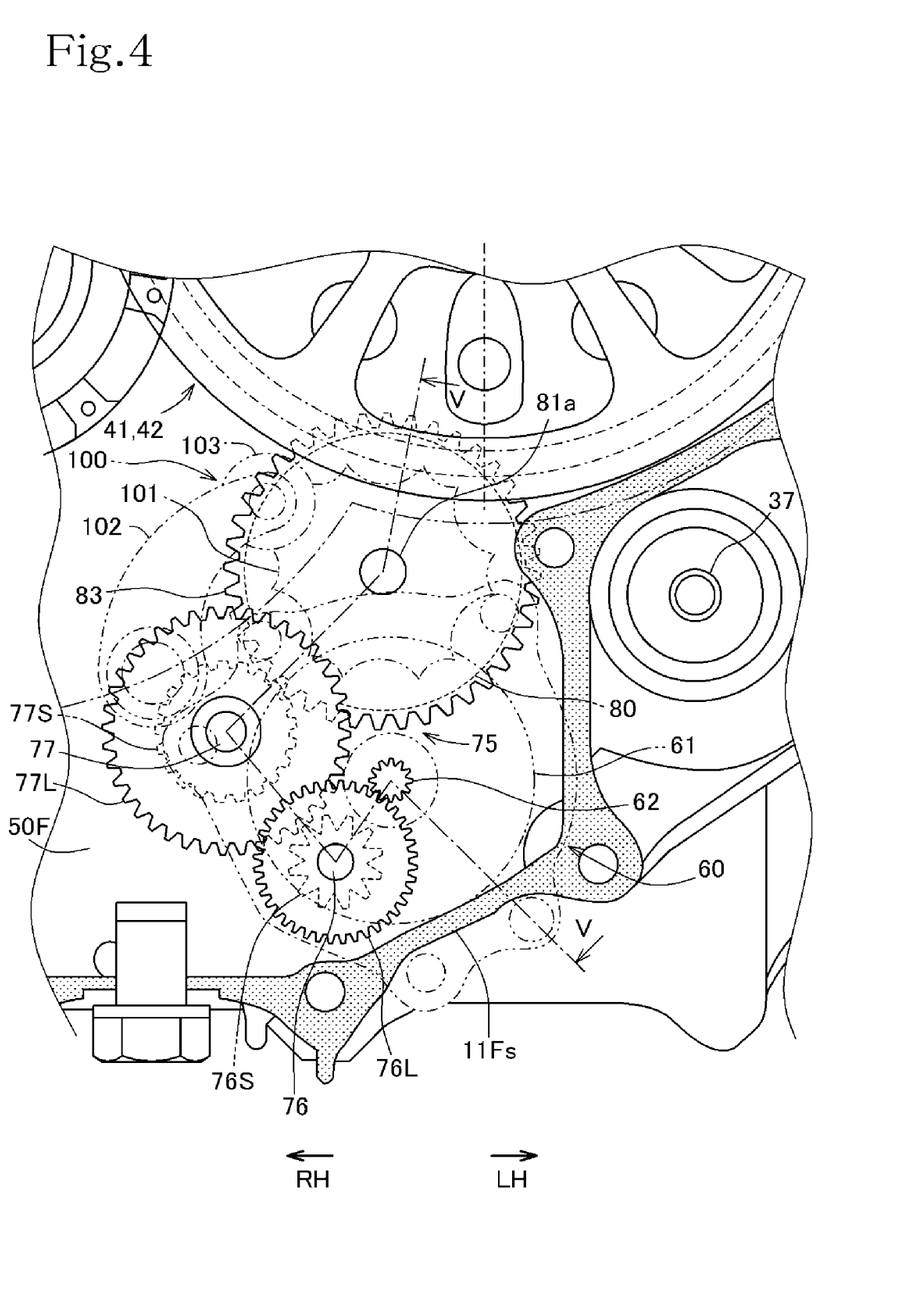
FIG. 4 is a front view of a major part in which a part of the vehicle power unit is omitted.
Figure 5:
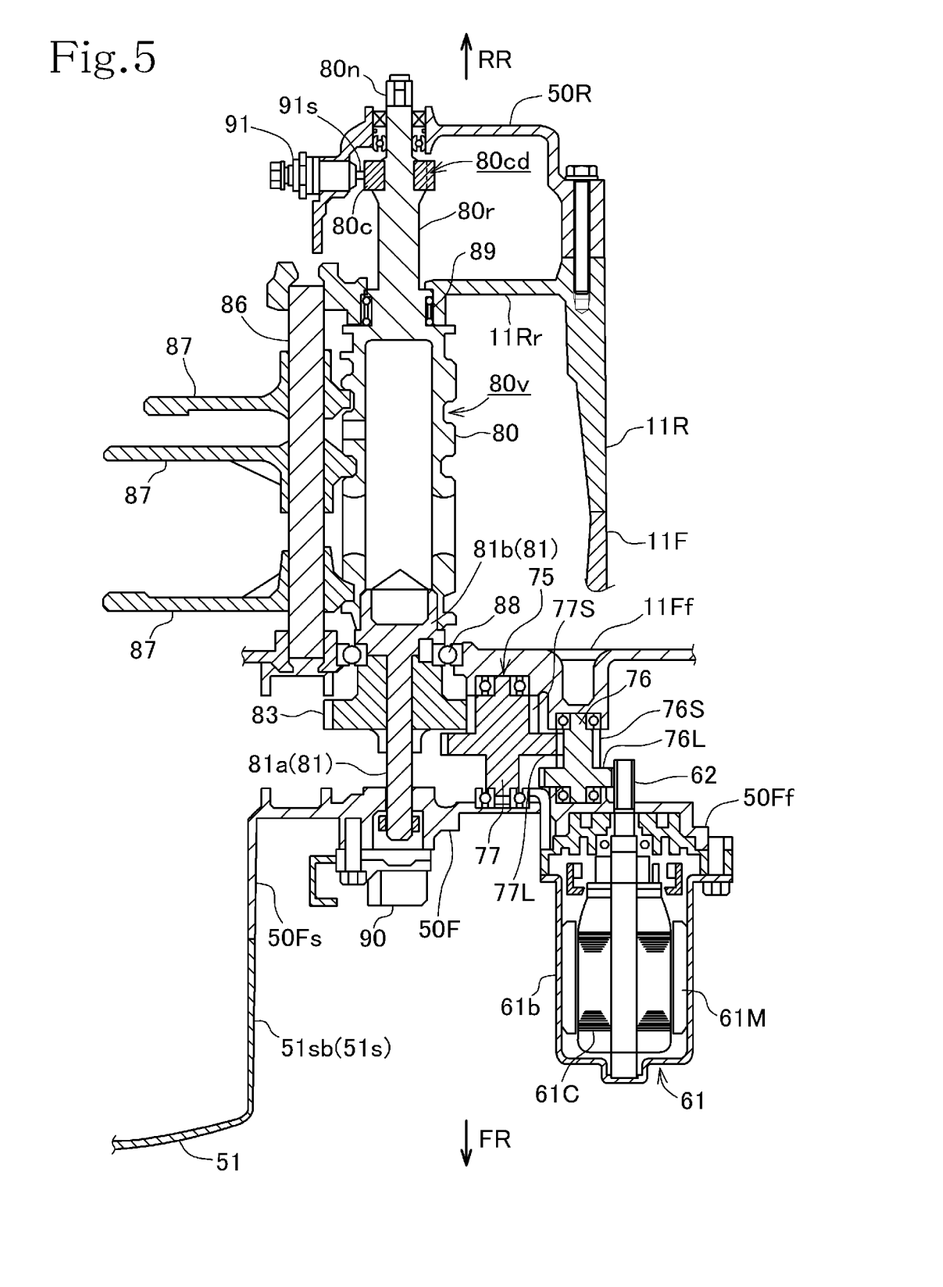
FIG. 5 is a developed sectional view of the vehicle power unit taken along arrows V-V of FIG. 4.

Referring to FIGS. 2 and 4, a shift drum 80 of the shift driving mechanism 60 is disposed under the first and second main shafts 31 and 32 (see FIG. 2). As depicted in FIG. 5, the shift drum 80 is rotatably supported by the front-side case side wall 11Ff and the rear-side case side wall 11Rr through bearings 88 and 89, respectively.

Referring also to FIG. 5, a front-side drum rotary shaft member 81 is firmly attached to a front end of the shift drum 80, with its boss portion 81b fitted to the front end. A rotary shaft portion 81a, protruding forward relative to the boss portion 81b, of the front-side drum rotary shaft member 81 has its front end rotatably supported on the front-side case cover 50F.

A driven gear 83 is fitted to the rotary shaft portion 81a of the front-side drum rotary shaft member 81, in a state of contact with the boss portion 81b.

A part where the driven gear 83 and the boss portion 81b make contact is supported by the bearing 88.

A drum rotational angle sensor 90 adapted to detect rotational angle of the shift drum 80 is provided at a front end of the rotary shaft portion 81a of the front-side drum rotary shaft member 81, which front end penetrates the front-side case cover 50F, in a state of being supported by the front-side case cover 50F.

As illustrated in FIG. 2, the drum rotational angle sensor 90 attached to the front-side case cover 50F is disposed in a state of being exposed directly under and along a lower-side peripheral wall portion 51sb of the tubular peripheral wall 51s of the clutch cover 51.

On the other hand, a rear portion of the shift drum 80 has a rear-side drum rotary shaft member 80r (see FIG. 5) extending rearward. A front portion of the rear-side drum rotary shaft member 80r is rotatably supported by the bearing 89, while a rear end of the rear-side drum rotary shaft member 80r penetrates the rear-side case cover 50R and protrudes to the rear.

A rear end portion of the rear-side drum rotary shaft member 80r constitutes a shifting knob 80n to which manual shifting force is applied.

The rear-side drum rotary shaft member 80r is formed with a disc cam 80c adjacent to the rear-side case cover 50R. A neutral switch 91 is provided to be directed to the disc cam 80c and supported by the rear-side case cover 50R.

When the shift drum 80 is at a neutral rotational angle, a detection rod 91s of the neutral switch 91 enters a recess 80cd formed in an outer peripheral surface of the disc cam 80c, whereby the neutral switch 91 can detect a neutral state of the shift drum 80.

Since the detection rod 91s, which is biased by a spring of the neutral switch 91, enters the recess 80cd of the disc cam 80c integral with the shift drum 80, a detent function is provided, and positioning at the neutral rotational angle of the shift drum 80 is performed.

Referring to FIG. 5, a shift fork shaft 86 is arranged on the front-side case side wall 11Ff and the rear-side case side wall 11Rr, in parallel with and along the shift drum 80. Shift forks 87 are supported on the shift fork shaft 86 in a manner slidable in front-rear directions. The shift forks 87 are moved in the front-rear axial directions while being guided by a lead groove 80v in the shift drum 80 being rotated.

The shift forks 87 move the shifter gears of the transmission driving gear groups 31g and 32g and the transmission driven gear group 33g of the transmission 30, to thereby make a gear shift.

As illustrated in FIGS. 2 and 5, an annular frame wall portion 50Ff is formed to extend forward in an area lower than that part of the front-side case cover 50F at which the drum rotational angle sensor 90 is attached. A shift motor 61 is attached to the annular frame wall portion 50Ff, with its driving gear 62 projecting rearward toward the front-side case side wall 11Ff.

When the shift motor 61 is thus attached to the annular frame wall portion 50Ff of the front-side case cover 50F, the driving gear 62 protruding to the rear side of the shift motor 61 is located under the rotary shaft portion 81a protruding to the front side of the shift drum 80 and between the front-side case cover 50F and the front-side case side wall 11Ff.

Referring to FIG. 2, a motor main body 61b of the shift motor 61 protrudes forward from the front-side case cover 50F. On the upper side of the motor main body 61b, the first and second shift clutches 41 and 42 are located in a state of being partitioned off by the lower-side peripheral wall portion 51sb of the tubular peripheral wall 51s of the clutch cover 51.

Specifically, referring to FIG. 2, the shift drum 80 is disposed under the first and second main shafts 31 and 32 of the transmission 30, and the shift motor 61 is disposed under the first and second shift clutches 41 and 42 provided at a front end portion of the first and second main shafts 31 and 32 which front end portion protrudes forward relative to the front-side case side wall 11Ff. Therefore, the shift motor 61 is accommodated in a space under the first and second shift clutches 41 and 42, on the front side relative to the shift drum 80, and can be disposed in a compact fashion.

In addition, referring to FIG. 2, the shift motor 61 is located under the clutch cover 51, and, therefore, the shift motor 61 is covered by the clutch cover 51 on the upper side thereof, and is protected from rainwater.

As illustrated in FIG. 2, the drum rotational angle sensor 90, which is disposed in a state of being exposed directly under and along the lower-side peripheral wall portion 51sb of the tubular peripheral wall 51s of the clutch cover 51, is attached to the front-side case cover 50F in a state of being interposed between the lower-side peripheral wall portion 51sb of the tubular peripheral wall 51s of the clutch cover 51 and the motor main body 61b of the shift motor 61.

Since the drum rotational angle sensor 90 is disposed between the clutch cover 51 and the shift motor 61, it is protected from external forces exerted by flying stones, for example, by the clutch cover 51 and the shift motor 61.

As depicted in FIG. 5, a rear end portion of the rear-side drum rotary shaft member 80r on the rear side opposite to the front-side drum rotary shaft member 81, at which the driven gear 83 of the shift drum 80 is mounted, is made to be the shifting knob 80n for manual shifting. Therefore, the shifting knob 80n is located on the side opposite to the shift motor 61 which is located on the front side relative to the shift drum 80, and can be operated without being obstructed by the shift motor 61. Therefore, a good operability is ensured.

Referring to FIG. 5, the driven gear 83 fitted to the front-side drum rotary shaft member 81 of the shift drum 80 is provided along a front surface of the front-side case side wall 11Ff. The driving gear 62 protruding to the rear side of the shift drum 80 attached to the front-side case cover 50F protrudes from a rear surface of the front-side case cover 50F. The driven gear 83 and the driving gear 62 are located in a space between the front-side case side wall 11Ff and the front-side case cover 50F which face each other.

As depicted in FIG. 4, the driven gear 83 and the driving gear 62 are located at positions vertically close to each other.

A speed reducing gear train 75 for transmitting power from the driving gear 62 to the driven gear 83 is sequentially arranged in a state of being supported by the front-side case side wall 11Ff and the front-side case cover 50F.

The speed reducing gear train 75 is a speed reducing gear train having three speed reduction stages, and gear shafts 76 and 77 are rotatably supported at both ends thereof by the front-side case side wall 11Ff and the front-side case cover 50F in a state of being directed in the front-rear direction.

Referring to FIG. 4, the first gear shaft 76 is located on an obliquely lower right side of the driving gear 62 located under and close to the driven gear 83, and the second gear shaft 77 is located on an obliquely upper right side of the first gear shaft 76 and on an obliquely lower right side of the driven gear 83.

The speed reducing gear train 75 has the first gear shaft 76, the second gear shaft 77 and the driven gear 83 arranged such as to surround the driving gear 62.

As also shown in FIG. 5, the first gear shaft 76 is integrally formed with a large-diameter gear 76L and a small-diameter gear 76S, and the second gear shaft 77 located on an obliquely upper right side thereof is integrally formed with a large-diameter gear 77L and a small-diameter gear 77S.

The driving gear 62 having a small diameter and protruding rearward from a rear surface of the front-side case cover 50F of the shift motor 61 meshes with the large-diameter gear 76L on the first gear shaft 76 to constitute a first speed reduction stage R1; the small-diameter gear 76S on the first gear shaft 76 meshes with the large-diameter gear 77L on the second gear shaft 77 to constitute a second speed reduction stage R2; and the small-diameter gear 77S on the second gear shaft 77 meshes with the driven gear 83 having a large diameter to constitute a third speed reduction stage R3.

In other words, the speed reducing gear train 75 includes three speed reduction stages of the first, second and third speed reduction stages R1, R2 and R3.

Therefore, rotation of the driving gear 62 of the shift motor 61 is transmitted to the driven gear 83 with speed reduction by the three speed reduction stages of the first, second and third speed reduction stages R1, R2 and R3 of the speed reducing gear train 75, whereby the rotation of the shift motor 61 is converted into rotation of the shift drum 80 integral with the driven gear 83.

When the shift drum 80 is rotated, the shift forks 87 are moved in the axial directions while being guided by the lead groove 80v formed in the outer peripheral surface of the shift drum 80, to move each shifter of the transmission 30 in the axial directions, thereby making a gear shift in the transmission 30.

Referring to FIGS. 4 and 5, as described above, in the shift driving mechanism 60, the front-side case side wall 11Ff of the crankcase 11 rotatably supporting the front-side drum rotary shaft member 81 provided with the driven gear 83 of the shift drum 80 is covered by the front-side case cover 50F positioned to oppose thereto, and the shift motor 61 is attached to the front-side case cover 50F.

Besides, the speed reducing gear train 75, having a multiplicity of speed reduction stages for transmitting power from the driving gear 62 of the shift motor 61 to the driven gear 83, has both ends of the first and second gear shafts 76 and 77 thereof arranged in the state of being rotatably supported on the front-side case side wall 11Ff and the front-side case cover 50F.

Therefore, the shift driving mechanism 60 is disposed in an integrated arrangement on the front-side case side wall 11Ff, whereby it is possible to restrain enlargement of the transmission system T and realize a reduction in size of the vehicle power unit P.

In addition, since the driving of the shift motor 61 is transmitted in rotation to the shift drum 80 through only the speed reducing gear train 75, an intermittent feeding mechanism is omitted, and it is possible to reduce the number of component parts of the shift driving mechanism 60, thereby to simplify the structure, to restrain an enlargement of the transmission system, to realize further reductions in size and cost of the vehicle power unit P, and to make a faster and smoother shift as compared to a shift by an electric motor.

Because an intermittent feeding mechanism is omitted, generation of shifting noises by the intermittent feeding mechanism is avoided, and there is no need for a soundproof structure.

The numbers of gear teeth of the driving gear 62, the large-diameter gear 76L, the small-diameter gear 76S, the large-diameter gear 77L, the small-diameter gear 77S and the driven gear 83 of the speed reducing gear train 75 are 11, 45, 10, 33, 17 and 42, respectively.

Therefore, in the speed reducing gear train 75, the speed reduction ratio of the first speed reduction stage R1 is set at approximately 4.1 (=45/11), that of the second speed reduction stage R2 is set at approximately 3.3 (=33/10), that of the third speed reduction stage R3 is set at approximately 2.5 (=42/17), and the speed reduction ratio of the speed reducing gear train 75 as a whole is set at approximately 33.4.

The shift motor 61 is a permanent magnet field system type DC commutator motor, in which ten coils 61C are arranged in the circumferential direction on the rotor side, and ten poles of permanent magnets 61M are arranged in the circumferential direction on the stator side in the periphery of the rotor.

In this shift motor 61, a maximum of a cogging torque generated by the action of magnetic forces of the permanent magnets 61M relative to coil cores when a current does not flow is approximately 0.052 Nm.

Figure 6:
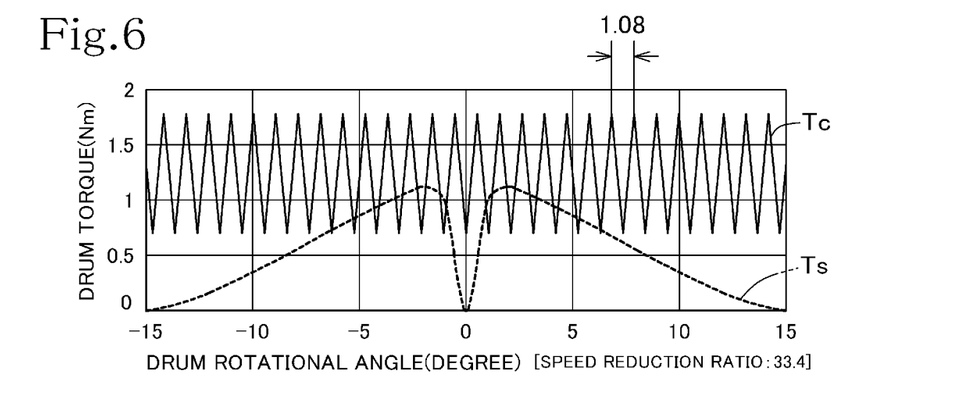
FIG. 6 is a graph depicting a variation in a cogging torque acting on a shift drum in a case where the speed reduction ratio of a speed reducing gear train is 33.4.

A variation in the cogging torque acting on the shift drum 80 in relation to the rotational angle of the shift drum 80 when the drive of the shift motor 61 rotates the shift drum 80 through the speed reducing gear train 75 with a speed reduction ratio of approximately 33.4 in the shift driving mechanism 60 configured as above is shown in FIG. 6.

In the graph in FIG. 6, the axis of abscissas is the rotational angle (drum rotational angle) (degrees) of the shift drum 80, in which the rotational angle of the drum positioned in a certain gear position is taken as 0 (zero) degree, rotation on the upshift side is taken as a positive rotational angle, and rotation on the downshift side is taken as a negative rotational angle.

The axis of ordinates is the torque (drum torque) (Nm) exerted on the shift drum 80.

The cogging torque Tc acting on the driving gear 62 of the shift motor 61 pulsates with the rotation, and its maximum value is approximately 0.052 Nm.

The cogging torque Tc acting on the driving gear 62 is transmitted through the speed reducing gear train 75 with a speed reduction ratio of approximately 33.4, and the drum torque acting on the shift drum 80 pulsates with a maximum value of 1.74 (=0.052×33.4) Nm, as depicted in FIG. 6.

The shift motor 61 has the ten coils 61C and the ten poles of permanent magnets 61M. The cogging torque pulsates ten times per revolution of the driving gear 62; in other words, the cogging torque pulsates once for a rotational angle of 36 degrees. Therefore, when transmitted through the speed reducing gear train 75 with a speed reduction ratio of approximately 33.4, the cogging torque Tc acting on the shift drum 80 pulsates once for a rotational angle of the shift drum 80 of 1.08 (=36/33.4) degrees as depicted in FIG. 6.

In FIG. 6, the curve indicated by broken line depicts a stopper torque Ts exerted on the shift drum by a stopper mechanism 100 (see FIG. 4) for positioning the rotational position of the shift drum 80.

As indicated by alternate long and two short dashes line in FIG. 4, the stopper mechanism 100 has a configuration in which a stopper roller 103 supported on a tip of a stopper arm 102 biased for oscillation is pressed against a projected and recessed peripheral cam surface of a star-shaped cam 101 provided on the front-side drum rotary shaft member 81 of the shift drum 80. With the stopper roller 103 fitted in a recess of the projected and recessed peripheral cam surface of the star-shaped cam 101, the shift drum 80 is positioned at a rotational position corresponding to a required gear position.

As depicted in FIG. 6, a torque Tc exerted on the shift drum 80 by the stopper mechanism 100 is 0 (zero) at 0 degrees which is the drum rotational angle of the drum positioned in a certain gear position, and the torque rises abruptly on both sides thereof.

When the drum rotational angle is 0 degrees, the stopper roller 103 is in the state of being fitted in one of the recesses of the projected and recessed peripheral cam surface of the star-shaped cam 101. In order to rotate the shift drum 80 from this state to make a gear shift, a torque is required which is equal to or higher than approximately 1.15 Nm corresponding to the peak of the torque Tc, which abruptly rises on both sides of the drum rotational angle of 0 degree. With a torque of less than approximately 1.15 Nm, the shift drum 80 cannot be rotated.

When the stopper torque Ts exerted on the shift drum 80 by the stopper mechanism 100 and the cogging torque Tc acting on the shift drum 80 are compared with each other, the cogging torque Tc, as depicted in FIG. 6, has a maximum of approximately 1.74 Nm, which is in excess of the maximum of the stopper torque Ts of approximately 1.15 Nm.

In the shift driving mechanism 60 including the shift motor 61 and the speed reducing gear train 75, therefore, the same positioning mechanism as that of the stopper mechanism 100 is provided by the cogging torque Tc acting on the shift drum 80, and the stopper mechanism 100 is not required and can be omitted.

In addition, in the shift driving mechanism 60, the conventionally needed intermittent feeding mechanism is also not required and can be omitted. Notwithstanding the omission of the intermittent feeding mechanism, it is possible, where the braking of the shift motor 61 by the cogging torque is effectively used by the speed reducing gear train 75, to suppress an overshoot amount of the shift drum 80 to a low level, and to stop the shift drum 80 at a target angle accurately.

In this way, even with the intermittent feeding mechanism and the stopper mechanism omitted, the shift driving mechanism 60 can easily stop the shift drum 80 at a required rotational position. Accordingly, it is possible to reduce the number of component parts of the shift driving mechanism 60, thereby to simplify the structure, and to realize a reduction in cost.

Since the speed reducing gear train 75 has the three speed reduction stages R1, R2 and R3, the speed reduction ratios of the speed reduction stages R1, R2 and R3 can be set as small as approximately 4.1, approximately 3.3 and approximately 2.5, respectively. Accordingly, the diameters of the large-diameter gears 76L, 77L and 78L of the speed reduction stages can be suppressed to be small, and the speed reducing gear train can be arranged in a compact fashion.

As illustrated in FIG. 4, the driving gear 62 is disposed under the driven gear 83, the speed reducing gear train 75 is arranged such as to surround the driving gear 62, and the speed reducing gears 76L, 76S, 77L and 77S of the speed reducing gear train 75 and the driven gear 83 overlap with each other as viewed sidewise. Therefore, the speed reducing gear train 75 is collectively arranged in the surroundings of the driving gear 62, and is arranged in a compact fashion. It is thus possible to arrange the shift driving mechanism 60 on the front-side case side wall 11Ff, in an integrated manner, thereby to restrain an enlargement of the transmission system, and to promote a reduction in the size of the vehicle power unit.

In the above-described embodiment, the speed reduction ratio of the speed reducing gear train 75 in the shift driving mechanism 60 is 33.4, so that the shift drum 80 can be easily stopped at a required rotational position, notwithstanding the omission of the stopper mechanism 100 as well as the intermittent feeding mechanism. However, if the speed reduction ratio of the speed reducing gear train 75 is lower than 23, it is difficult to omit the stopper mechanism.

Figure 7:
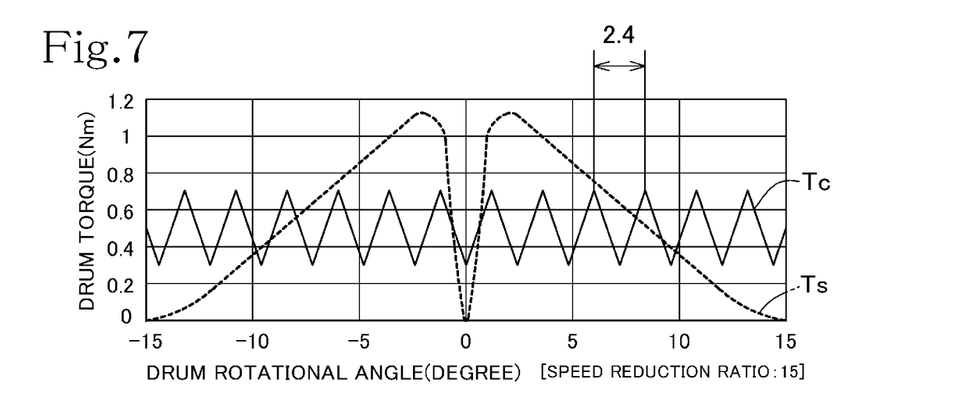
FIG. 7 is a graph depicting a variation in the cogging torque acting on the shift drum in an exemplary case where the speed reduction ratio of the speed reducing gear train is 15.

FIG. 7 depicts a variation in a cogging torque Tc acting on a shift drum in a case where the shift motor 61 used in the above embodiment is used and the speed reduction ratio of the speed reducing gear train is 15.

The cogging torque Tc acting on the shift drum has a maximum of approximately 1.74 Nm, which is lower than the maximum of the stopper torque Ts of approximately 1.15 Nm.

Therefore, the positioning function of the stopper mechanism cannot be performed by the cogging torque Tc exerted by the shift motor 61, and, accordingly, a stopper mechanism 100 is required whose characteristics are indicated by alternate long and two short dashes line in FIG. 4.

However, the conventionally required intermittent feeding mechanism is unnecessary, and, accordingly, it is possible to reduce the number of component parts of the shift driving mechanism 60, to thereby simplify the structure, to restrain an enlargement of the transmission system, and to realize a reduction in the size of the vehicle power unit P.

In addition, with the intermittent feeding mechanism omitted, generation of shifting noises by the intermittent feeding mechanism is avoided, and a soundproof structure is not required.

Figure 8:
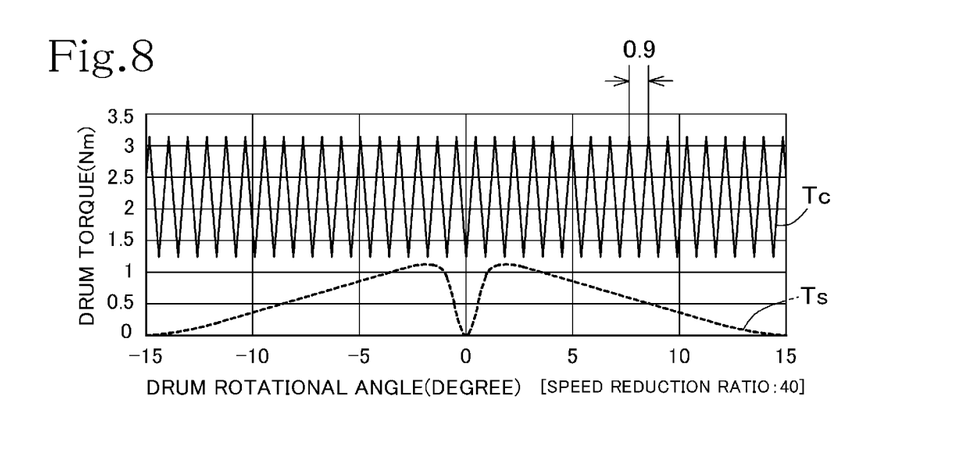
FIG. 8 is a graph depicting a variation in the cogging torque acting on the shift drum in an exemplary case where the speed reduction ratio of the speed reducing gear train is 40.

On the contrary, FIG. 8 shows a variation in a cogging torque Tc acting on a shift drum when the speed reduction ratio of the speed reducing gear train is high, for example, 40.

In this case, the shift motor used is the same as that used in the above embodiment.

As depicted in FIG. 8, the cogging torque Tc acting on the shift drum has a maximum value of approximately 3.2 Nm, which is much higher than the maximum value of the stopper torque Ts of approximately 1.15 Nm.

Therefore, the positioning function of the shift drum can be effectively offered by the cogging torque Tc exerted by the shift motor 61, and the stopper mechanism as well as the intermittent feeding mechanism is not required.

As the speed reduction ratio of the speed reducing gear train increases, switching of speed stage is slowed.

When the speed reduction ratio of the speed reducing gear train exceeds 45, considerable time is required for movement of transmission gears, so that it takes considerable time to switch the speed stage, and meshing of a dog clutch is not performed smoothly.

Consequently, increases in the size and output of the shift motor are required.

In addition, a small-type shift motor has a cogging torque maximum value of around 0.05 Nm. If the cogging torque maximum value is lower than 0.04 Nm, it would be difficult to position the shift drum. If the cogging torque maximum value exceeds 0.07 Nm, rotational driving of the shift motor would be unsmooth, and the shift motor would be a large-sized heavy weight body.

While the vehicle power unit P according to an embodiment of the present invention has been described above, the mode of the invention is not limited to the above embodiment, and the invention may be carried out in various modes within the scope of the gist of the invention.

REFERENCE SIGNS LIST

P . . . Vehicle power unit, E . . . Internal combustion engine, T . . . Transmission system;

1 . . . All terrain vehicle, 2F . . . Front drive shaft, 2R . . . Rear drive shaft, 3R . . . Rear final reduction gear unit, 3F . . . Front final reduction gear unit, 4F . . . Front fender, 4R . . . Rear fender, 5 . . . Side cover, 6 . . . Step plate, 7 . . . Seat, 8 . . . Body frame;

10 . . . Crankshaft, 11 . . . Crankcase, 11F . . . Front crankcase half, 11Ff . . . Front-side case side wall, 11R . . . Rear crankcase half, 11Rr . . . Rear-side case side wall, 12 . . . Cylinder, 13 . . . Cylinder head, 14 . . . Cylinder head cover, 15 . . . Piston, 16 . . . Connecting rod, 17 . . . Main bearing;

20 . . . Starting clutch, 21 . . . Clutch inner member, 22 . . . Clutch outer member, 23 . . . Clutch shoe, 24 . . . Clutch spring, 25 . . . Driving gear, 26 . . . Driven gear, 27 . . . Gear disc, 28 . . . Sleeve, 29 . . . AC generator;

30 . . . Transmission, 31 . . . First main shaft, $31g$ . . . Transmission driving gear group, 32 . . . Second main shaft, $32g$ . . . Transmission driving gear group, 33 . . . Counter shaft, 34, 35 . . . Bearing, 36 . . . Output driving gear, 37 . . . Output shaft, 38 . . . Bearing, 39 . . . Output driven gear;

41 . . . First shift clutch, 42 . . . Second shift clutch;

50F . . . Front-side case cover, 50Fs . . . Tubular portion, 51 . . . Clutch cover, $51s$ . . . Tubular peripheral wall, $51sb$ . . . Lower-side peripheral wall portion;

60 . . . Shift driving mechanism, 61 . . . Shift motor, $61b$ . . . Motor main body, 62 . . . Driving gear;

75 . . . Speed reducing gear train, 76 . . . First gear shaft, 76L . . . Large-diameter gear, 76S . . . Small-diameter gear, 77 . . . Second gear shaft, 77L . . . Large-diameter gear;

80 . . . Shift drum, 81 . . . Front-side drum rotary shaft member, 82 . . . Bolt, 83 . . . Driven gear, 84 . . . Needle bearing, 85 . . . Ball bearing, 86 . . . Shift fork shaft, 87 . . . Shift fork, 88, 89 . . . Bearing;

90 . . . Drum rotational angle sensor, 91 . . . Neutral switch;

100 . . . Stopper mechanism, 101 . . . Star-shaped cam, 102 . . . Stopper arm, 103 . . . Stopper roller.

The invention claimed is:

1. A vehicle power unit longitudinally mounted on a small-type vehicle, wherein an internal combustion engine and a transmission system are integrally supported on a crankcase of the power unit and wherein the transmission system includes a transmission having gear pairs differing in transmission gear ratio for transmitting power, and a shift driving mechanism having a shift drum rotated by a shift motor to make a shift by changing the gear pair for transmitting power in the transmission through movement of a shift fork guided by the shift drum, characterized in that:

the shift drum has rotary shaft members at its both ends rotatably supported on both case side walls of the crankcase;

one of the drum rotary shaft members of the shift drum is provided with a driven gear;

one of the case side walls of the crankcase supporting the one drum rotary shaft member provided with the driven gear is covered by a case cover member in opposing disposition thereto;

the shift motor is supported by the one case cover member with its driving gear protruding toward the one case side wall;

a speed reducing gear train having gear shafts to provide a multiplicity of speed reduction stages for transmitting power from the driving gear to the driven gear is arranged with ends of the gear shafts thereof supported on the one case side wall and the one case cover member, respectively;

the speed reducing gear train is arranged to surround the driving gear; and the speed reducing gear train has speed reducing gears overlapping with the shift motor in an axial direction of an axis of the driving gear view.

2. The vehicle power unit according to claim 1, wherein:

the transmission has main shafts under which the shift drum is disposed;

clutch devices are provided at end portions of the main shafts, the end portions protruding beyond the one case side wall; and the shift motor is disposed under the clutch devices.

3. The vehicle power unit according to claim 2, wherein:

the clutch devices are covered by a clutch cover; and the shift motor is located under the clutch cover.

4. The vehicle power unit according to claim 3, wherein a drum rotational angle sensor for detecting rotational angle of the shift drum is mounted to the case cover member while being interposed between the clutch cover and the shift motor, the drum rotational angle sensor being connected to an end portion, penetrating the case cover member, of the one drum rotary shaft member.

5. The vehicle power unit according to claim 1, wherein an end portion of the other drum rotary shaft member opposite to the one drum rotary shaft member is a shifting knob for manual shifting operation.

6. The vehicle power unit according to claim 2, wherein an end portion of the other drum rotary shaft member opposite to the one drum rotary shaft member is a shifting knob for manual shifting operation.

7. The vehicle power unit according to claim 3, wherein an end portion of the other drum rotary shaft member opposite to the one drum rotary shaft member is a shifting knob for manual shifting operation.

8. The vehicle power unit according to claim 4, wherein an end portion of the other drum rotary shaft member opposite to the one drum rotary shaft member is a shifting knob for manual shifting operation.

9. The vehicle power unit according to claim 1, wherein: the driving gear is arranged between the driven gear and each of the speed reducing gears of the speed reducing gear train in anaxial direction view of an axis of the driving gear.

\* \* \* \* \*